United States Patent [19]
Motoi

[11] Patent Number: 6,154,292
[45] Date of Patent: Nov. 28, 2000

[54] MULTI-BEAM SCANNING METHOD AND CONTROL APPARATUS FOR THE SAME

[75] Inventor: Toshihiro Motoi, Hachioji, Japan

[73] Assignee: Konica Corporation, Tokyo, Japan

[21] Appl. No.: 09/021,107

[22] Filed: Feb. 10, 1998

[30] Foreign Application Priority Data

Feb. 14, 1997 [JP] Japan .................................... 9-030212

[51] Int. Cl.[7] .................................................... H04N 1/04
[52] U.S. Cl. ....................... 358/474; 358/475; 358/481; 347/236; 347/246; 347/253
[58] Field of Search .................................. 358/481, 474, 358/475; 347/236, 246, 253

[56] References Cited

U.S. PATENT DOCUMENTS

| | | | |
|---|---|---|---|
| 4,423,426 | 12/1983 | Kitamura | 346/108 |
| 4,933,549 | 6/1990 | Fujioka et al. | 250/235 |
| 5,043,745 | 8/1991 | Inoue et al. | 346/108 |
| 5,202,774 | 4/1993 | Ishimitsu | 358/488 |
| 5,504,517 | 4/1996 | Takashi et al. | 347/246 |
| 5,576,852 | 11/1996 | Sawada et al. | 358/475 |
| 5,635,321 | 6/1997 | Van Hunsel et al. | 430/30 |
| 5,677,723 | 10/1997 | Soya et al. | 347/247 |
| 5,883,385 | 3/1999 | Takahashi et al. | 250/235 |
| 5,986,687 | 11/1999 | Hori | 347/246 |

FOREIGN PATENT DOCUMENTS 2-188713  7/1990  Japan .

*Primary Examiner*—Kimberly A. Williams
*Attorney, Agent, or Firm*—Frishauf, Holtz, Goodman, Langer & Chick, P.C.

[57] ABSTRACT

An apparatus for scanning with multiple beams emitted from a semiconductor laser by a polygonal mirror, wherein an image is written for each scanning line by each beam of the multiple beams. The apparatus includes an automatic light amount control circuit having: (i) a light amount detecting circuit to detect a light amount of each beam for each scanning line, and (ii) a sampling/holding circuit to sample and hold a control voltage corresponding to the detected light amount of each beam for each scanning line. The automatic light amount control circuit controls the semiconductor laser based on the control voltage held by the sampling/holding circuit so as to control the light amount of each beam to be a predetermined light amount for each scanning line. The apparatus also includes a synchronization control circuit having an index sensor and a light receiving section on which each beam passes. The index sensor detects a passage of each beam on the light receiving section and generates a passage signal for each beam, and the synchronization control circuit controls each beam based on the passage signal so as to be synchronized with other beams for each scanning line. The automatic light amount control circuit, moreover, controls the light amount of each beam for each scanning line before each beam on each scanning line enters the light receiving section of the synchronization control section.

8 Claims, 13 Drawing Sheets

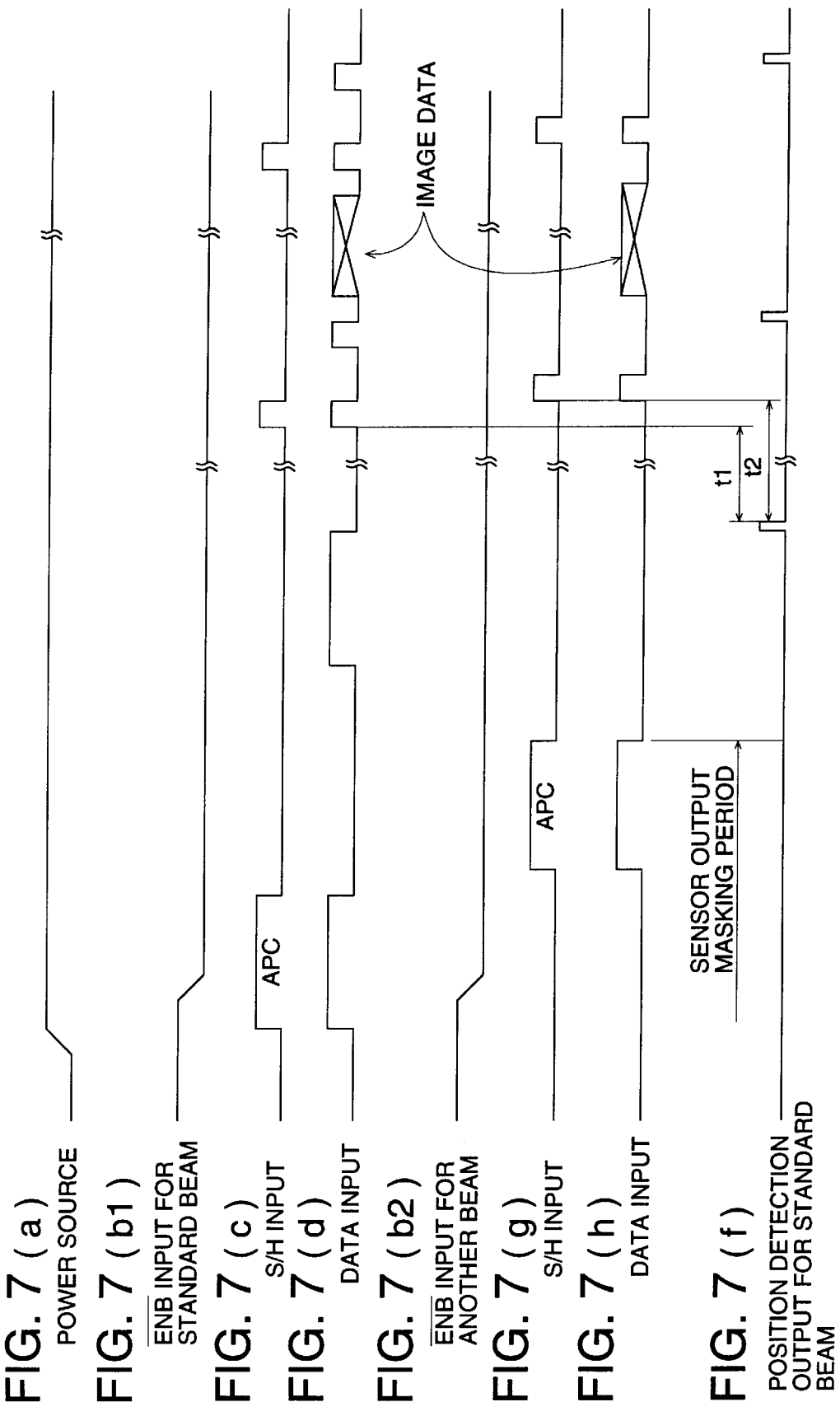

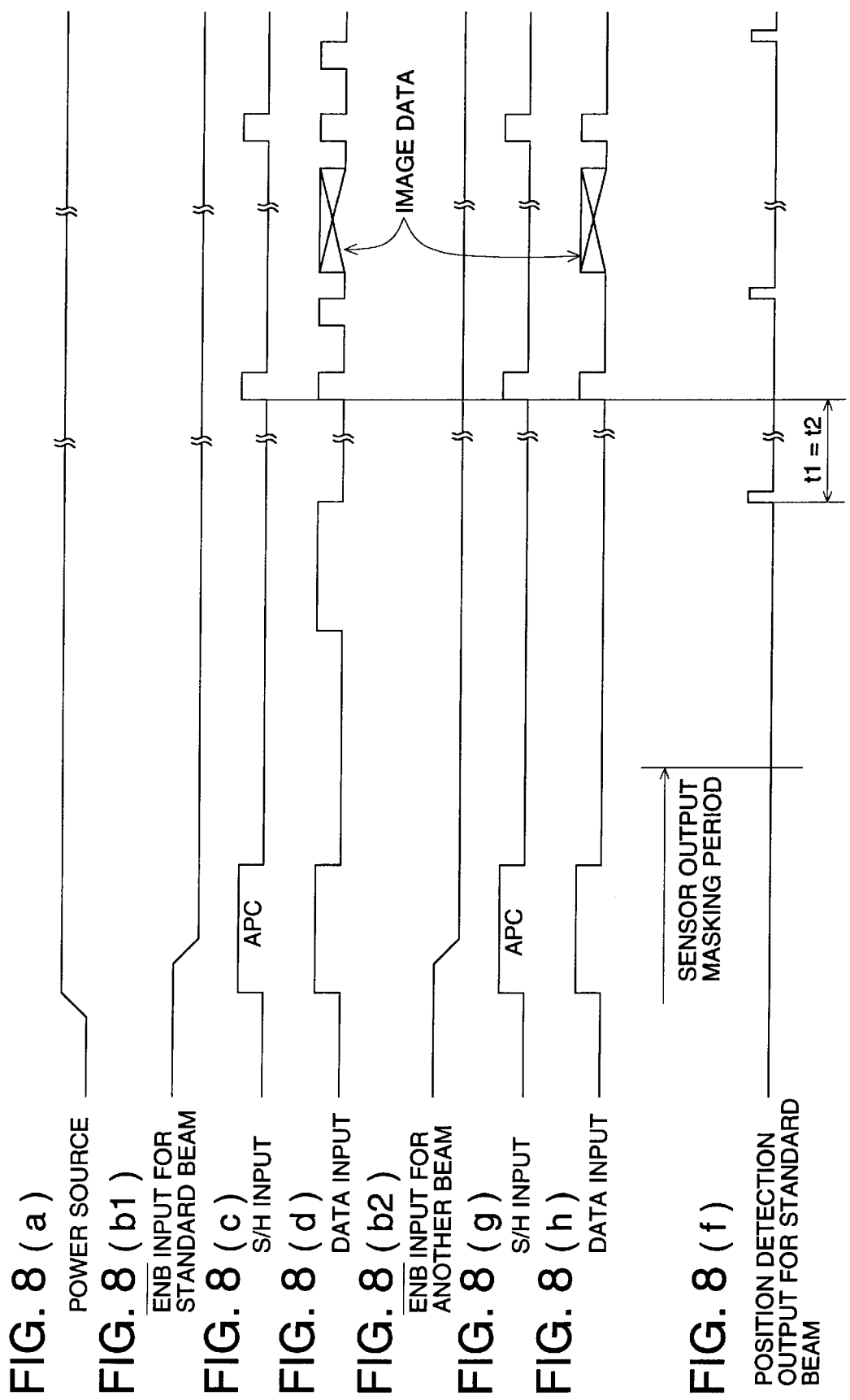

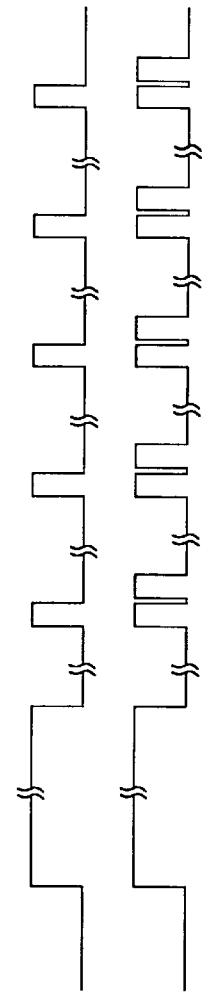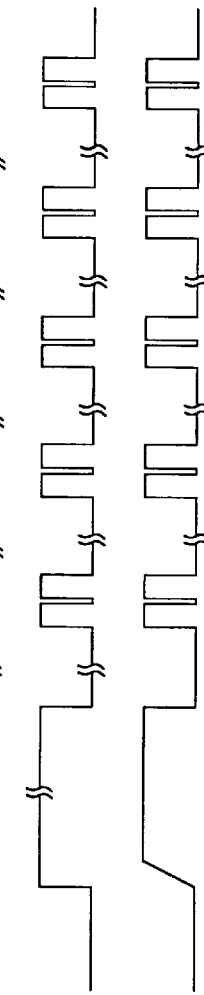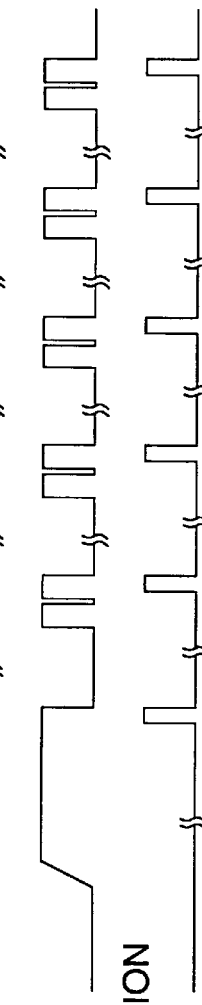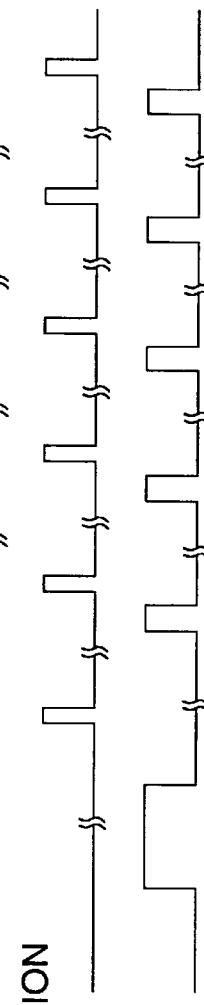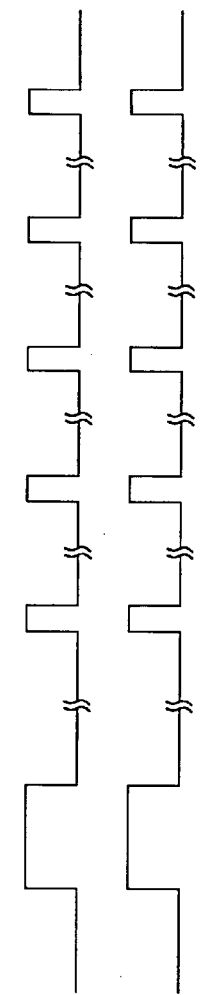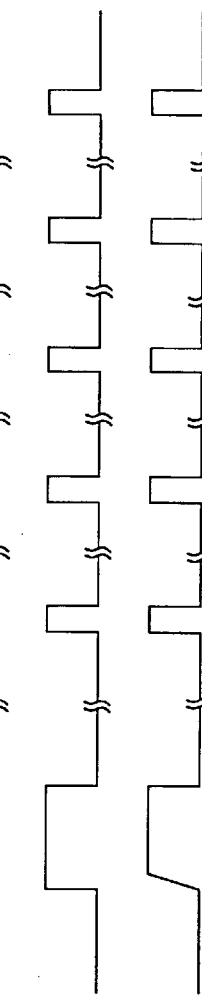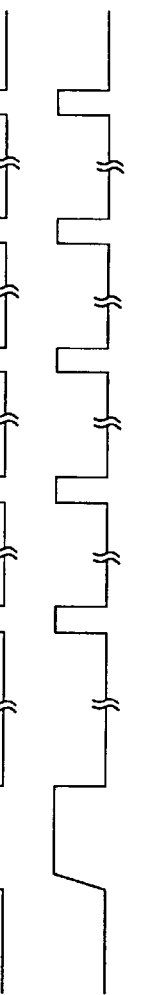
FIG. 9(a) POWER SOURCE
FIG. 9(b) ENB INPUT
FIG. 9(c) S/H INPUT
FIG. 9(d) DATA INPUT
FIG. 9(e) LASER DRIVE CURRENT
FIG. 9(f) POSITION DETECTION OUTPUT FOR STANDARD BEAM
FIG. 9(g) S/H INPUT
FIG. 9(h) DATA INPUT
FIG. 9(i) LASER DRIVE CURRENT

MULTI-BEAM SCANNING METHOD AND CONTROL APPARATUS FOR THE SAME

BACKGROUND OF THE INVENTION

The present invention relates to a multi-beam scanning method wherein multiple beams are deflected by a rotary polygon mirror and then, are converged by an image focusing optical system to spots, whereby the surface of an image carrier is scanned by plural scanning lines simultaneously, and to a multi-beam scanning control apparatus employing the multi-beam scanning method.

For attaining the demand for high speed recording, there has been known a multi-beam scanning control apparatus (see TOKKAIHEI 2-188713) wherein multiple beams emitted from plural semiconductor lasers are deflected by a rotary polygon mirror or the like, and then are converged by an image focusing optical system into spots, and the surface of an image carrier is scanned by plural lines simultaneously, thus two-dimensional images are formed while the image carrier is rotated in the sub-scanning direction that is perpendicular to the primary scanning direction. In the multi-beam scanning control apparatus, it is necessary to correct a displacement quantity based on a standard beam and thereby to conduct synchronization control, for preventing optical axis displacement in the primary scanning direction and the sub-scanning direction for multiple beams. In the multi-beam scanning control apparatus employing such synchronization control, incidence position in the primary scanning direction on the image carrier of multiple beams is detected by an index sensor provided in the vicinity of the image carrier surface, and whereby horizontal synchronization signals are obtained. On the other hand, for stabilizing potential of a latent image formed on the image carrier, there is a technique that a semiconductor laser beam light quantity is stabilized based on signals obtained when a semiconductor laser beam light quantity is subjected to sample-and-hold for each scanning line, and the technique is abbreviated as line APC hereinafter.

FIG. 13 is a time chart showing operations of a non-semiconductor laser control circuit. FIG. 13(a) is a time chart showing the state of sample-and-hold, in which a high level represents the sample state and a low level represents the hold state. FIG. 13(b) is a time chart showing the state of input of image data, FIG. 13(c) is a time chart showing an electric current for driving a semiconductor laser, and FIG. 13(d) is a time chart showing output of position detection for the standard beam.

Time charts shown in FIG. 13 indicate that a line APC scanning control circuit in a conventional individual beam has obtained horizontal synchronization signals with detection signals from an index sensor at the end of sample processing for the so-called line APC.

However, when attempting to conduct multi-beam scanning control with the control timing of line APC in a single beam like that stated above, it has been difficult to detect a laser beam which represents a standard among plural laser beams entering an index sensor because a beam position detection is conducted without controlling properly a quantity of light of multiple beams entering the index sensor, resulting in problems. This will be explained in detail as follows.

FIG. 14 is a conceptual diagram showing the state of scanning on an index sensor by multiple beams.

If there is no optical axis displacement in the primary scanning direction for each laser beam, when multiple beams enter a light-intercepting portion of the index sensor simultaneously as shown in FIG. 14(a), a quantity of light intercepted by the index sensor is larger than that for a single beam as shown in FIG. 14(d). Such phenomenon can be a cause for malfunction when a displacement amount is detected and corrected based on the standard beam and thereby synchronization control is performed.

If there is an optical axis displacement in the primary scanning direction for each laser beam, the standard laser beam does not always enter the light-intercepting portion first as shown in FIG. 14(b). The detecting circuit judges inadvertently that the signal inputted first is a standard signal, and fails accordingly to detect the standard laser beam accurately as shown in FIG. 14(c), resulting in an impossibility of detection of an accurate displacement amount and of correction therefor.

SUMMARY OF THE INVENTION

The invention has been achieved in view of the problems mentioned above, and its object is to provide a multi-beam scanning method capable of detecting accurately the laser beam which serves as a standard for correcting the position to start writing and optical axis displacement in the control of light quantity of multiple beams employing line APC and a multi-beam scanning apparatus used in the multi-beam scanning method.

The object mentioned above can be attained by the following structures.

(1) A multi-beam scanning control apparatus provided with an automatic light quantity control circuit which conducts sample-and-hold of a quantity of light of multiple beams emitted from a semiconductor laser for each scanning line with a sample-and-hold circuit and stabilizes the quantity of light of the multiple beams based on signals related to the sample-and-hold, and with a synchronization control circuit which detects a plane position of a rotary polygon mirror by causing the standard beam to enter an index sensor and thereby synchronizes the multiple beams, wherein the control of a quantity of light is completed in the automatic light quantity control circuit before the multiple beams reach a light-intercepting portion of the index sensor.

(2) A multi-beam scanning method conducting sample-and-hold of a quantity of light of multiple beams emitted from a semiconductor laser for each scanning line, then stabilizing the quantity of light of the multiple beams based on signals related to the sample-and-hold, and detecting a plane position of a rotary polygon mirror by causing the standard beam to enter an index sensor and thereby synchronizing the multiple beams, wherein the control of a quantity of light of the multiple beams is completed before the multiple beams reach a light-intercepting portion of the index sensor.

BRIEF DESCRIPTION OF THE DRAWINGS

FIGS. 7(a) to 7(h), FIGS. 8(a) to 8(h) and FIGS. 9(a) to 9(i) are time charts showing operations of the semiconductor laser control circuit in the present embodiment.

DETAILED DESCRIPTION OF THE PREFERRED EMBODIMENT

Before explaining a multi-beam scanning method and its multi-beam scanning control apparatus in the present embodiment, a scanning optical system to be controlled will be explained as follows, referring to FIGS. 1 and 2.

Figure 1:
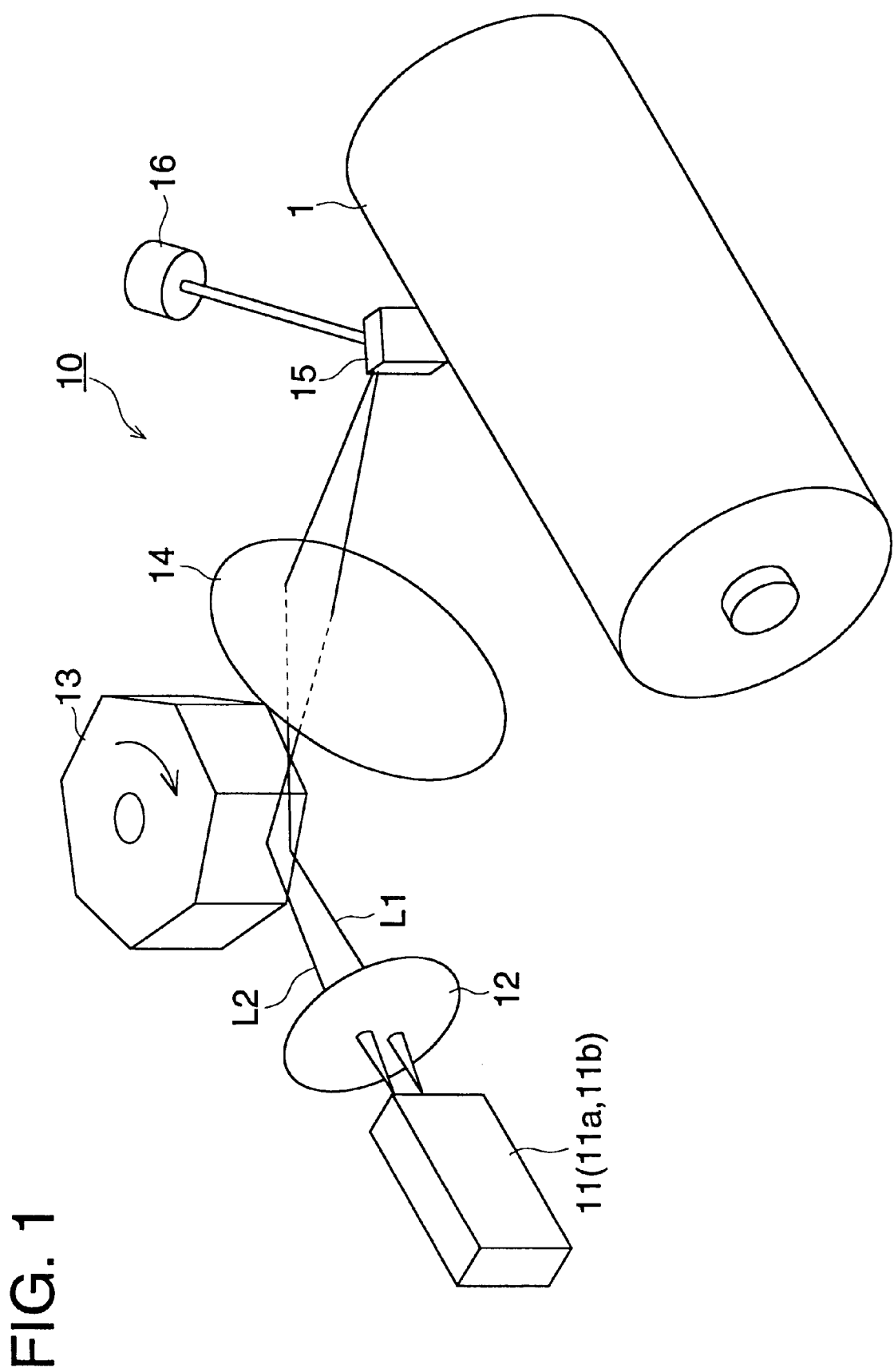
FIG. 1 is a perspective view showing a scanning optical system of a laser printer in the present embodiment.
Figure 2:
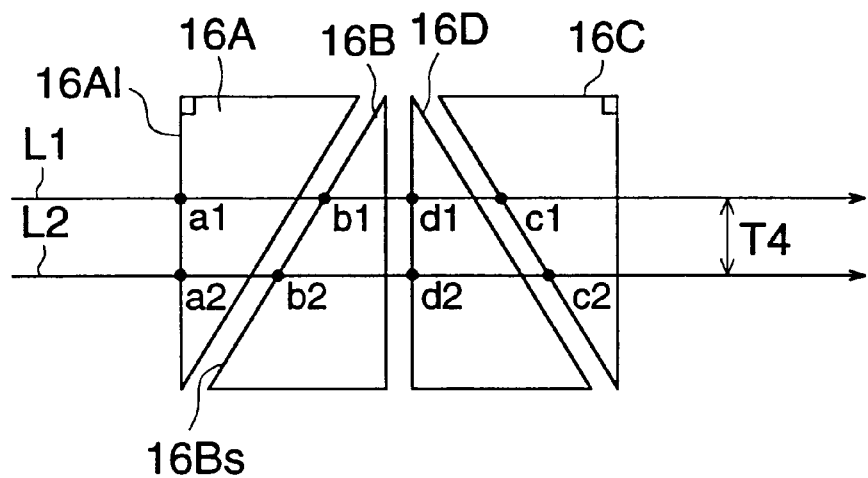
FIG. 2 is an illustrative diagram showing the detailed structure of an index sensor.

FIG. 1 is a perspective view showing a scanning optical system of a laser printer in the present embodiment in which an array-aligned semiconductor laser to output multiple beams from a single tip semiconductor is used, and FIG. 2 is an illustrative diagram showing the detailed structure of an index sensor. Needless to say, the present invention is not limited to the array-aligned semiconductor laser. That is, the present invention can be applied to the system in which plural semiconductor lasers are used.

Scanning optical system 10 is one wherein semiconductor lasers 11a and 11b are oscillated by image signals modulated in accordance with image data to emit multiple beams L1 and L2 which are deflected by polygon mirror 13 rotating at a prescribed speed and are converged by fθ lens 14 to spots each corresponding to 600 DPI on image carrier 1 so that multiple beams L1 and L2 are caused to scan in parallel to form 2-line latent images simultaneously, and the scanning optical system 10 is composed of light source unit 11, collimator lens 12, polygon mirror 13, fθ lens 14, reflecting mirror 15 and index sensor 16.

In the present embodiment, the primary scanning direction is represented by the direction in which multiple beams L1 and L2 scan and the sub-scanning direction is represented by the direction in which image carrier 1 is moved. The image carrier 1 is driven to rotate in synchronization with scanning by multiple beams L1 and L2, and thereby the multiple beams L1 and L2 and the image carrier 1 move relatively in the sub-scanning direction, thus imagewise exposures corresponding to image data are conducted simultaneously for two lines, and 2-dimensional latent images are recorded on the image carrier 1.

In the light source unit 11, two semiconductor laser emitting sections 11a and 11b for which GaAlAs is used as the semiconductor are arranged on a line, maximum output is 10 mW, light efficiency is 25%, and a divergent angle is 8–16° in the direction parallel with a composition plane and is 20–36° in the direction perpendicular to the composition plane. Due to this structure, light source unit 11 emits two divergent light.

Collimator lens 12 converges two divergent light emitted from light source unit 11 into multiple beams L1 and L2 representing two parallel light fluxes.

Incidentally, when pointing to either one of multiple beams L1 and L2, it is called laser beam L1 or laser beam L2.

The polygon mirror 13 is one corresponding to a deflection optical system, and it converges a beam, and makes Petzval's sum and astigmatic difference to be small for realizing a flat scanning plane. It also deflects multiple beams L1 and L2 entered from collimator lens 12 and directs them to fθ lens 14. Incidentally, by providing a correction optical system (not shown) in the optical path, pitch irregularity of scanning lines caused by the plane inclination error of polygon mirror 13 is lowered.

For realizing a flat scanning plane, fθ lens 14 makes Petzval's sum and astigmatic difference small, and eliminates a curved image plane. Behind the fθ lens 14, there is provided an image focusing optical system which focuses multiple beams L1 and L2 to form an image.

The reflecting mirror 15 is one to guide multiple beans L1 and L2 to index sensor 16 when multiple beams L1 and L2 are projected on the tip of a scanning line.

The index sensor 16 is one to detect a point where each of multiple beams L1 and L2 deflected by the polygon mirror 13 starts scanning, and it is composed of sensors 16A, 16B, 16C and 16D which are provided respectively with light-intercepting portions each being in a shape of a right-angled triangle and are arranged in the primary scanning direction as shown in FIG. 2.

The sensor 16A is arranged so that longer side 16A1 among two sides forming a right angle of the light-intercepting portion in a shape of a right-angled triangle may serve as an edge on the detection-starting side in the primary scanning direction, and the longer side 16A1 may be perpendicular to the primary scanning direction (in parallel with the sub-scanning direction) as shown in FIG. 2. The sensor 16B is arranged so that oblique side 16Bs of the light-intercepting portion in a shape of a right-angled triangle may serve as an edge on the detection-starting side in the primary scanning direction, and a beam may intersect with the oblique side 16Bs obliquely at an angle formed by the longer side and the oblique side as shown in FIG. 2. The sensor 16D is arranged in a way that the intercepting portion of the sensor 16A is turned upside down in terms of its arrangement, when the sub-scanning direction is assumed to be vertical, as shown in FIG. 2.

The sensor 16C is arranged so that the sensor 16A and the light-intercepting portion of the sensor 16C are axial symmetry about the axis which is in parallel with the sub-scanning direction as shown in FIG. 2. Due to the arrangement of the sensors 16A–16D stated above, the edge on the detection-starting side of the sensor 16A in the primary scanning direction and the edge on the detection-starting side of the sensor 16D in the primary scanning direction are in parallel with each other in the sub-scanning direction, and the edge on the detection-starting side of the sensor 16B in the primary scanning direction and the sensor 16C are not in parallel with each other.

For example, if multiple beams L1 and L2 scan in the order of sensors 16A, 16B, 16D and 16C as shown in FIG. 2, a detection-starting position of the laser beam L1 by the sensor 16A is a1, and a detection-starting position of the laser beam L2 by the sensor 16A is a2. In the same way, detection-starting positions of the laser beams L1 and L2 by the sensors 16B–16D are respectively b1, b2, c1, c2, d1 and d2. With these arrangements, a detection signal rises from each of the sensors 16A, 16B, 16C and 16D.

A method to measure an interval displacement in the sub-scanning direction between multiple beams L1 and L2 in the present embodiment will be explained.

Figure 3:
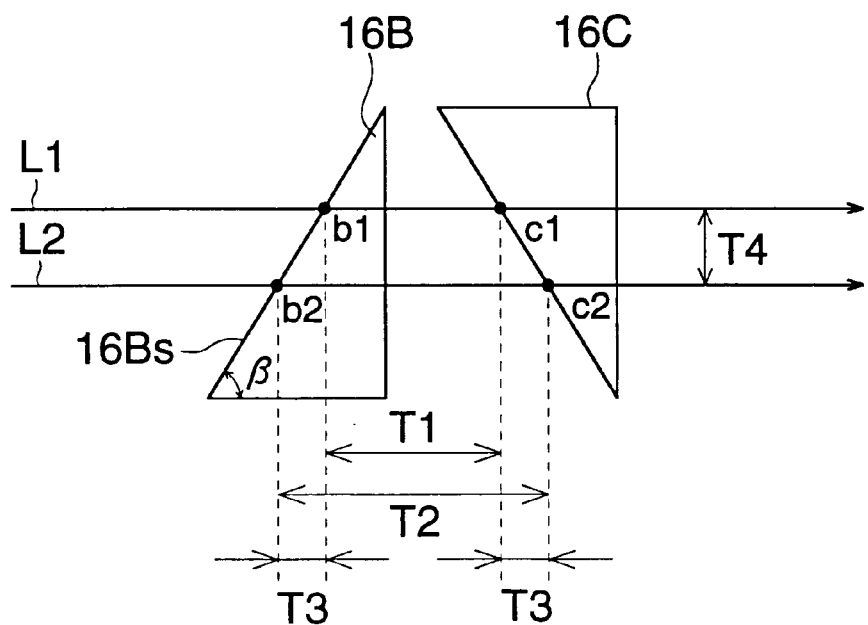
FIG. 3 is an illustrative diagram illustrating the principle of detecting displacement in the sub-scanning direction.

FIG. 3 is an illustrative diagram explaining the principle for detecting displacement in the sub-scanning direction.

The sensor 16B and the sensor 16C are arranged side by side in the primary scanning direction so that edges on the detection-starting side of light-intercepting portions of them in the primary scanning direction are not in parallel with each other. Therefore, the distance between the edges is changed along the sub-scanning direction which is perpendicular to the primary scanning direction. This means that when laser beam L1 only is caused to be on to cause the sensor 16B and sensor 16C to detect, time interval T1 from the rise (b1) of beam detection of sensor 16B to the rise c1 of beam detection of sensor 16C is changed depending on the scanning position in the sub-scanning direction, and when laser beam L2 only is caused to be on in place of laser beam L1 so that laser beam L2 may scan the sensors 16A–16D, time interval T2 from the rise (b2) of beam detection of sensor 16B to the rise (c2) of beam detection of sensor 16C is also changed depending on the scanning position in the sub-scanning direction. Therefore, when rise time intervals T1 and T2 for multiple beams L1 and L2 are measured, deviation T3 of time interval in multiple beams L1 and L2 takes a value correlating with an interval in the sub-scanning direction between the multiple beams L1 and L2, and that it indicates a change of an interval between laser beams in the sub-scanning direction (hereinafter referred to as a displacement of an optical axis in the sub-scanning direction).

Now, a difference between a standard value of deviation T3 corresponding to the normal state of an interval in the sub-scanning direction between multiple beams L1 and L2 and deviation T3 obtained by the measurement stated above will be obtained as a value corresponding to an amount of displacement of an interval.

With regard to the standard value of deviation T3, when the scanning position of laser beam 2 is deviated in the sub-scanning direction, for example, under the assumption that positions b1 and c1 in the sub-scanning direction where laser beam L1 is detected by sensors 16B and 16C are the standard positions, position b2 in the sub-scanning direction where laser beam L2 is detected by sensor 16B is deviated to the scanning starting end side, while position c2 in the sub-scanning direction where laser beam L2 is detected by sensor 16C is deviated to the scanning terminating end side, due to an arrangement wherein positions b2 and c2 are extended to the both sides in the primary scanning direction as an interval between edges on the detection starting end sides of sensor 16B and sensor 16C is lowered, thus, time T2 becomes long and time T3 becomes longer for the standard. Therefore, if the deviation between time T3 and the standard value is obtained, a displacement amount of an interval between multiple beams L1 and L2 can be calculated based on information of scanning speed and angles of oblique sides of sensors 16B and 16C.

The foregoing is a method to measure an interval displacement in the sub-scanning direction in the present embodiment.

When an interval displacement in the sub-scanning direction between multiple beams L1 and L2 is detected in the above-mentioned method, time difference caused by displacement is varied by an angle at which oblique sides of sensors 16B and 16C intersect obliquely with the primary scanning direction, and it is preferable that angle B° is set to be as sharp as possible, in other words, an interval between oblique sides of sensors 16B and 16C in the detection area is changed sharply in the sub-scanning direction, and it is further preferable that the angle B° is determined based on accuracy of adjusting a scanning position and on resolution of time measurement.

Next, a method to measure an interval displacement in the primary scanning direction between multiple beams L1 and L2 in the present embodiment will be explained.

Figure 4:
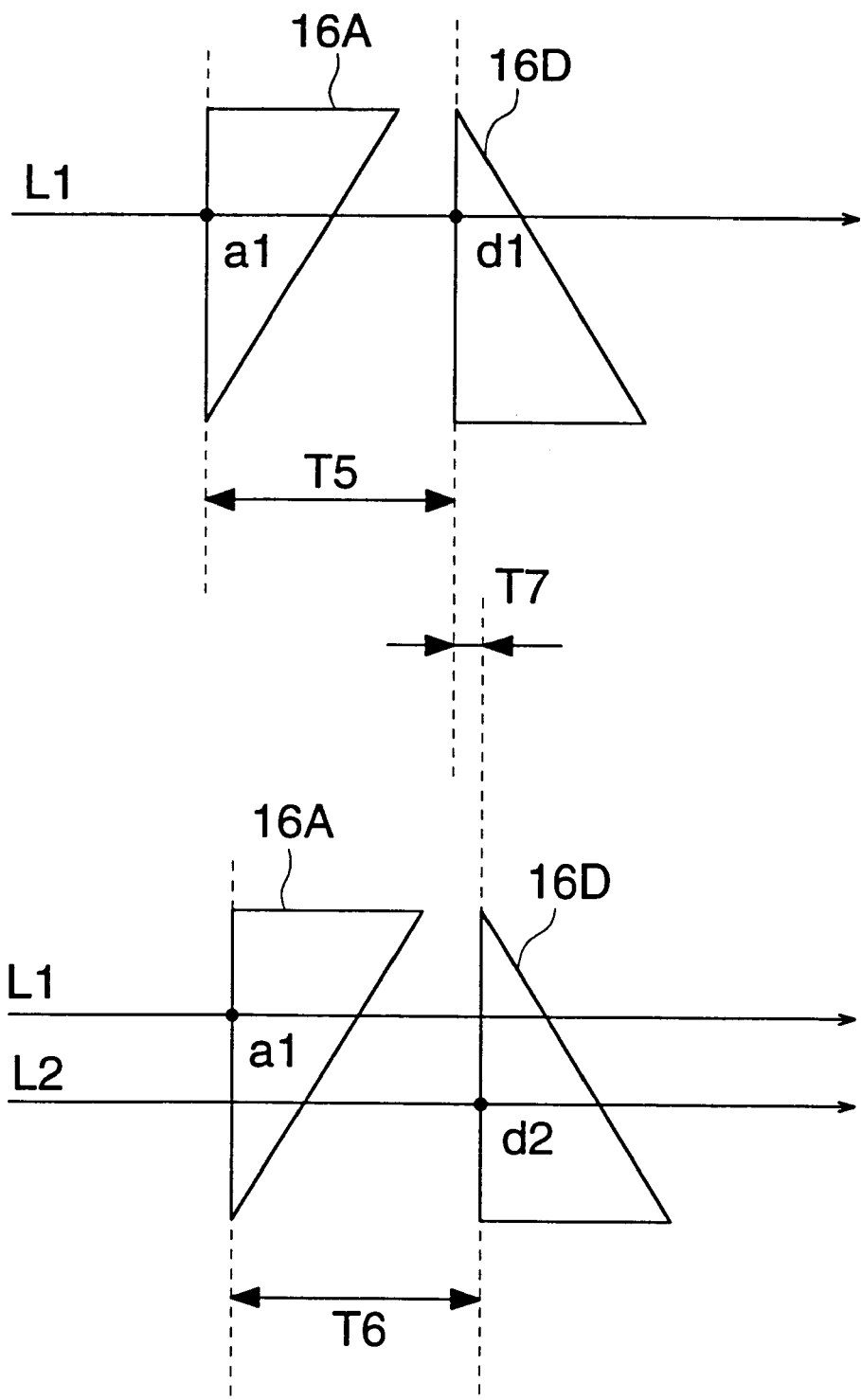
FIG. 4 is an illustrative diagram illustrating the principle of detecting displacement in the primary scanning direction.

FIG. 4 is an illustrative diagram explaining the principle for detecting displacement in the primary scanning direction.

For example, in the combination of sensor 16A and sensor 16D, edges on the detection starting end side of light-intercepting portions in the primary scanning direction are in parallel each other. Accordingly, displacement of scanning position in the primary scanning direction is not affected by time interval at which a laser beam is detected by sensor 16A and sensor 16D, and positional relation in the primary scanning direction only can be taken out, whereby displacement in the primary scanning direction in multiple beams L1 and L2 can be detected.

To be concrete, if time interval T5 between rise (a1) where laser beam L1 is detected by sensor 16A and rise (d1) where laser beam L1 is detected by sensor 16D is measured by turning only laser beam L1 on under the control of on and off of multiple beams L1 and L2, the time interval T5 can be determined only by an interval between edges on the detection starting end side of the sensor 16A and sensor 16D in the primary scanning direction and by scanning speed, without being affected by the scanning position in the sub-scanning direction, because edges on the detection starting end side of light-intercepting portions of the sensor 16A and sensor 16D in the primary scanning direction are in parallel with the sub-scanning direction.

Next, if time interval T6 between rise (a1) where laser beam L1 is detected by sensor 16A and rise (d2) where laser beam L2 is detected by sensor 16D is measured by making multiple beams L1 and L2 to scan while conducting mask control for the multiple beams so that only laser beam L1 may enter sensor 16A and only laser beam L2 may enter sensor 16D, under the control of on and off of multiple beams L1 and L2, the time interval T5 and the time interval T6 are supposed to be the same in terms of time when the multiple beams L1 and L2 are scanned without being deviated in the primary scanning direction, because edges on the detection starting end side of light-intercepting portions of the sensor 16A and sensor 16D in the primary scanning direction are in parallel with the sub-scanning direction. For example, when the laser beam L2 is scanned to be behind the scanning of the laser beam L1, its time lag can be obtained as T6-T5 (=T7).

Therefore, when laser beam L2 is caused to start writing after laser beam L1 starts writing by time T7, the image recording can be carried out without being deviated in the primary scanning direction by two multiple beams L1 and L2 scanned to be deviated in the primary scanning direction.

Incidentally, with regard to a shape and a combination of each light-intercepting portion of sensors 16A–16D, the detection of displacement in the sub-scanning direction only needs a combination of a sensor wherein edges on the detection starting end side of a light-intercepting portion in the primary scanning direction are not in parallel, the detection of displacement in the primary scanning direction only needs a combination of a sensor wherein edges on the detection starting end side of a light-intercepting portion in the primary scanning direction are in parallel to be perpendicular to the primary scanning direction, and a shape of the light-intercepting portion may either be triangular or be square if an edge on the detection starting end side of the light-intercepting portion in the primary scanning direction has been decided.

Next, a semiconductor laser control circuit 100 for a line APC in the present embodiment will be explained, referring to FIGS. 5 and 6.

Figure 5:
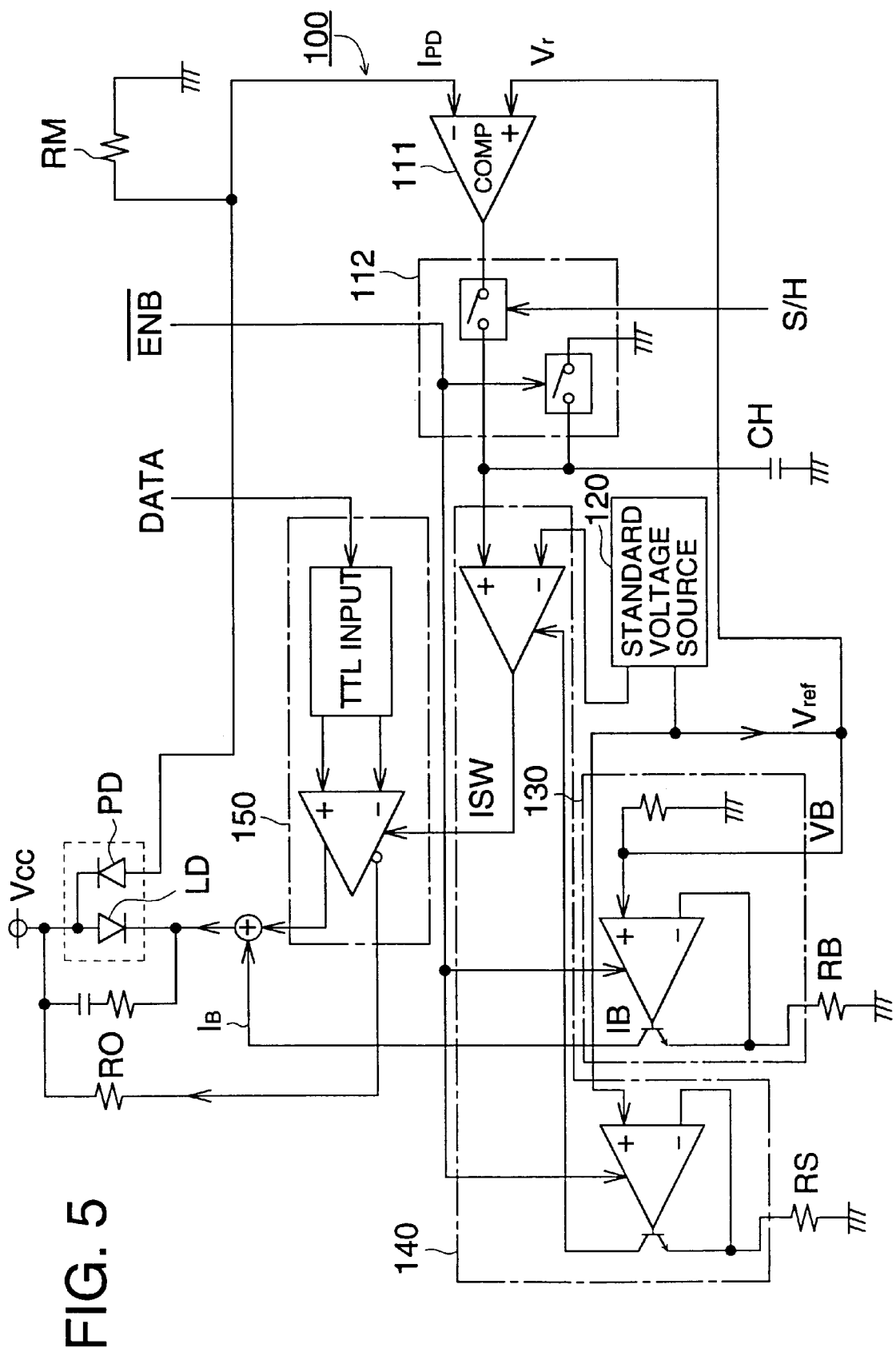
FIG. 5 is a block diagram showing a semiconductor laser control circuit in the present embodiment.
Figure 6:
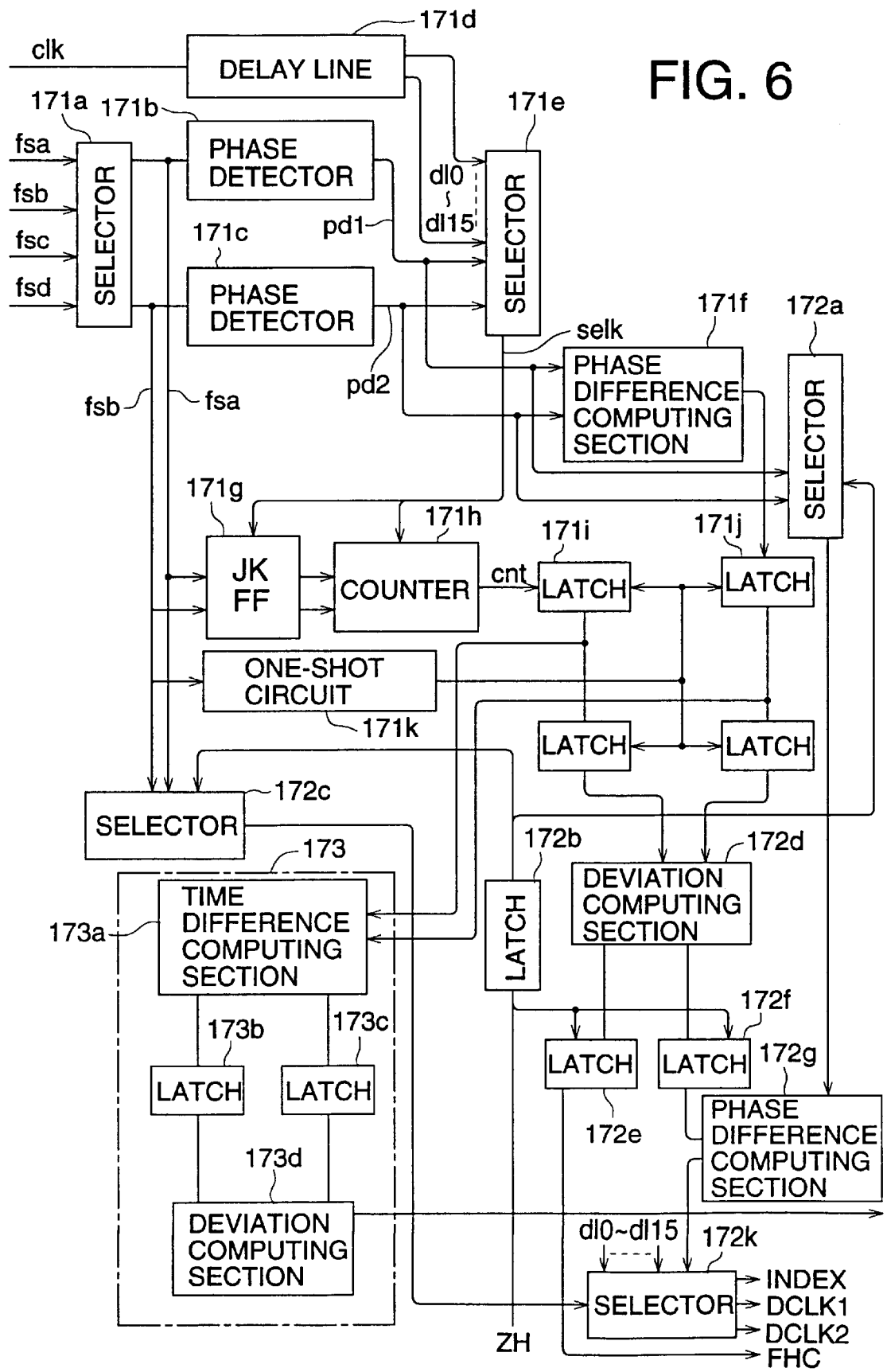
FIG. 6 is a block diagram showing details of a synchronization control circuit.

FIG. 5 is a block diagram showing semiconductor laser control circuit 100 in the present embodiment, and FIG. 6 is a block diagram showing the details of a synchronization control circuit.

In semiconductor laser control circuit 100, an anode of semiconductor laser LD used as semiconductor laser 11a or of semiconductor laser 11b is connected with a cathode of photodiode PD for monitor use, whereby driving current for the semiconductor laser LD and laser power are controlled. As shown in FIG. 5, the semiconductor laser control circuit 100 comprises comparator 111, sample-and-hold circuit 112, standard voltage source 120, bias current source 130, switching current source 140 and current switching circuit 150. Multi-beam scanning control circuit comprises two sets of the semiconductor laser control circuit 100 for the semiconductor lasers 11a and 11b and a synchronization control circuit as shown in FIG. 6. As another example of the multi-beam scanning control circuit, it may be possible to use a single set of the semiconductor laser control circuit 100 for both of the semiconductor lasers 11a and 11b by changing it alternately one after another for both of the semiconductor lasers 11a and 11b.

The semiconductor laser control circuit 100 is provided with a laser drive current outputting terminal of a sink type, and it can drive a laser with drive current. Since the semiconductor laser control circuit 100 houses therein high speed sample-and-hold circuit 112, a self-APC (automatic power control) system which needs no external laser power control is realized. Structures and functions of each section will be explained as follows.

The self-APC is realized by resistor for setting switching current RS, photodiode PD, load resistor for monitoring photodiode current RM, comparator 111, and by sample-and-hold circuit 112, in which a quantity of light of beams coming from semiconductor lasers 11a and 11b is subjected to sample-and-hold conducted by the photodiode PD and the sample-and-hold circuit 112 for each scanning line, and an electric current to flow through the semiconductor lasers 11a and 11b is controlled based on the light amount signal related to the sample-and-hold, so that a quantity of light of beams may be constant. Due to this, it is possible to adjust potential of a latent image.

A PD current generated by emission of semiconductor laser 11a or semiconductor laser 11b flows through resistor. Due to this, voltage VM is generated. Comparator 111 compares the voltage VM with voltage impressed on Vr terminal. When the result of the comparison conducted by the comparator 111 represents VM<Vr, an electric current is subject to source from CH terminal of the sample-and-hold circuit 112 and charges external capacitor CH, while when the result of the comparison conducted by the comparator 111 represents VM>Vr, an electric current is synchronized from CH terminal of the sample-and-hold circuit 112 and discharges external capacitor CH.

Standard voltage source 120 is a circuit generating the standard voltage and it supplies standard voltage to bias current source 130 and switching current source 140.

Bias current source 130 is a circuit which generates bias current $I_B$ for semiconductor lasers 11a and 11b, and the bias current $I_B$ is established by adjusting load for setting bias current $R_B$ and voltage for setting bias current $V_B$.

Switching current source 140 is a circuit which generates current for switching Isw, and an initial value of the current for switching Isw is established for conducting APC with good brightness, by adjusting resistor for setting switching current and load resistor for monitoring photodiode current RM. The load resistor for monitoring photodiode current RM is set so that terminal voltage of the load resistor for monitoring photodiode current RM may be the same as standard input voltage Vr when the semiconductor laser is driven by the initial set value of the current for switching Isw.

Current switching circuit 150 is one which controls drive current for semiconductor lasers based on DATA. Resistor RO is a load resistor for drive current, and when it is connected to power supply $V_{CC}$ to allow an electric current which is mostly the same as Isw to flow therethrough, power consumption can be reduced.

Next, an outline of operations of semiconductor laser control circuit 100 in the present embodiment will be explained, referring to FIGS. 7(a) to 7(f), FIGS. 8(a) to 8(f) and FIGS. 9(a) to 9(i).

FIGS. 7(a) to 7(f), FIGS. 8(a) to 8(f) and FIGS. 9(a) to 9(i) represent time charts showing operations of semiconductor laser control circuit 100 in the present embodiment. FIGS. 7(a) to 7(f) and FIGS. 8(a) to 8(f) are the former part of FIGS. 9(a) to 9(i) respectively and show time charts to emphasis the feature of the present invention. In FIGS. 7(a) to 7(f), an array-aligned semiconductor laser emits two laser beams whose light amounts are controlled one after another by a single set of the semiconductor laser control circuit 100 before the two laser beams enter the light receiving section of the index sensor. In FIGS. 8(a) to 8(f), two sets of semiconductor laser emit two laser beams whose light amounts are controlled simultaneousely independently by tow sets of the semiconductor laser control circuits 100 before the two laser beams enter the light receiving section of the index sensor.

The time charts are now explained with reference to the embodiment shown in FIGS. 7(a) to 7(h). However, the similar operations are conducted in the embodiments show in FIGS. 8(a) to 8(f) and FIG. 9(a).

FIG. 7(a) represents a time chart showing how power supply is turned on. There is housed a reset circuit for preventing that overcurrent flows through semiconductor lasers 11a and 11b when power supply is turned on, and within a range of $V_{CC}$<3.5 V, bias current source 130 and switching current source 140 are turned off, and a CH terminal is fixed to "L" level forcibly.

FIGS. 7(b1) and 7(b2) represent a time chart showing the state of input of $\overline{ENB}$. The control by means of input of $\overline{ENB}$ covers turning on and turning off for operations of switching current source 140, while the control of drive current by means of input of DATA controls drive current for semiconductor lasers 11a and 11b when the current source is turned on. To be concrete, bias current source 130 and switching current source 140 are turned on with $\overline{ENB}$="L", and bias current source 130 and switching current source 140 are turned off with $\overline{ENB}$="H". In the case of $\overline{ENB}$="H", a CH terminal is fixed to level "L" forcibly, and externally-fixed capacitor CH charges are discharged forcibly.

FIG. 7(c) represents a time chart showing sample-and-hold state S/H of the standard laser beam among multiple beams. The beam is sampled in the case of S/H input="H" and DATA="H", and a CH terminal is held in the state of high impedance (hold) independently of VM, Vr and the state of input of DATA, in the case of S/H input="L" state.

FIG. 7(d) represents a time chart showing the state of input of image data DATA of the standard laser beam among multiple beams. Drive current becomes Isw+$I_B$ in the case of DATA="H" shown in FIG. 7(d), while it becomes $I_B$ in the case of DATA="L". FIG. 7(f) is a time chart showing position detection output of the standard laser beam among multiple beams. Incidentally, In FIGS. 7(a) to 7(f) and FIGS. 8(a) to 8(f), APC represents a period during which the light amount control is conducted for the semiconductor laser by the line APC.

FIG. 7(g) represents a time chart showing sample-and-hold state of the non-standard laser beam among multiple beams, in which the laser beam shows the state of sample at a high level and the state of hold at a low level. FIG. 7(h) represents a time chart showing the state of input of image data of the non-standard laser beam among multiple means, and FIG. 7(i) represents a time chart showing drive current for a semiconductor laser of the non-standard laser beam among multiple means.

After the state of no rotation of polygon mirror 13 scanning multiple beams or after the stable rotation following turning on of power supply, all sample-and-hold circuits 112 are made to be on the state of sample under the condition that output of index sensor 16 is masked for a certain period of time, and output voltage from standard voltage source 120 is raised to vicinity of standard operation voltage. Incidentally, in the present embodiment, when sample-and-hold circuit 112 is set on the sample state, modulation signals is set at on-state.

Before completion of a masking period, all sample-and-hold circuits 112 are made to be on the state of hold, and modulation signals are turned off.

The modulation signal for the standard laser beam only among multiple beams L1 and L2 is made to be on the state of on, a semiconductor laser continues to be on. Due to this, under the condition that semiconductor laser 11 continues to be switched on at the outside an image forming area on image carrier 1 based on index signals from index sensor 16, sample-and-hold circuit 112 is switched to the state of sample before the index sensor 16 is scanned by the standard laser beam among multiple beams L1 and L2. After sampling, the sample-and-hold circuit 112 is switched to the state of hold, then the modulation signal is made on-state and enter the index sensor so tat the index signal used as the standard is generated.

Based on index signals obtained from the standard laser beam among multiple beams L1 and L2, remaining laser beams are subjected to sample-and-hold at the same timing as that of the standard laser beam. Thereafter, the sample-and-hole circuit is made on the state of hold and the modulation signals are made to be on the state of off so that other beams may not enter the index sensor.

Incidentally, sample-and-hold timing for multi-beams in the case of using a plurality of semiconductor laser may be the same or may not be the same as that of the standard beam. That is, as far as laser beam has the sample timing at which a laser beam does not enter an index sensor outside an image area on image carrier 1, it may be established specifically to each laser beam based on the standard index signal. However, in the case that a single tip array-aligned semiconductor laser is used, since only a single set of the photodiode PD is provided inside, it is necessary to set the sample-and-hold timing for multi-beams different from that of the standard beam.

By obtaining horizontal synchronization signals under the condition that sampling light of line APC of multiple beams does not enter an index sensor as stated above, that is, by conducting the light amount control for the multi-beams before the multi-beam enter the index sensor, it is possible to stabilize a quantity of light of multiple beams and to detect the standard laser beam for the position to start writing and correction of optical axis displacement accurately.

Next, the detailed structure of a synchronization control circuit will be explained, referring to FIG. 6.

The synchronization control circuit is a circuit to detect positions of planes of polygon mirror 13 rotating at a prescribed speed and to synchronize them in the primary scanning direction, by entering multiple beams L1 and L2 into index sensor 16 from a deflection optical system shown in FIG. 1 through mirror 15, and it is provided, in particular, with functions to detect displacement in the primary direction of multiple beams and the sub-scanning direction. It is therefore composed with time interval measuring section 171, computing section for displacement in the primary scanning direction 172 and computing section for displacement in the sub-scanning direction 173.

The time interval measuring section 171 is a circuit to measure time intervals T1, T2, T5 and T6 shown in FIGS. 3 and 4, and it is composed of selector 171a, phase detectors 171b and 171c, delay line 171d, selector 171e, phase difference computing section 171f, flip-flop 171g, counter 171h, latches 171i and 171j and one-shot circuit 171k.

The selector 171a is one to output with a combination of either two of detection signals fsa, fsb, fsc and fsd of sensors 16A, 16B, 16C and 16D in accordance with each correction mode. An explanation will be made under the assumption that sensors 16B and 16C are used for measurement of interval displacement in the sub-scanning direction as stated in the present embodiment, referring to FIG. 3, and sensors 16A and 16D are used for measurement of interval displacement in the primary scanning direction as stated referring to FIG. 4.

Phase detectors 171b and 171c represent a pulse generating circuit which outputs analog signals inputted from selector 171a as pulse signals. Pulse signals pd1 outputted from phase detector 171b become input for selector 171e, phase difference computing section 171f and selector 172a, and pulse signals pd2 outputted from phase detector 171c become input for phase difference computing section 171f and selector 172a.

Delay line 171d outputs clocks d10–d115 having a phase difference to selector 171e and selector 172h with standard clock clk serving as an input.

When assuming that a mode is a measurement mode for interval displacement in the sub-scanning direction, selector 171e is a circuit to detect each of delay clocks d10–d115 synchronizing with the rise of detection signals pd1 and pd2 of sensors 16B and 16C at phase detectors 171b and 171c, and to output such delay clock selc to flip-flop 171g and counter 171h.

When assuming that a mode is a measurement mode for interval displacement in the sub-scanning direction, phase difference computing section 171f obtains a phase difference (1/16 cycle unit) between a clock synchronizing with detection timing (b1 or b2) of sensor 16B and that synchronizing with detection timing (c1 or c2) of sensor 16C, namely a fraction within a clock cycle of detection interval of sensors 16B and 16C, and sends the results thereof to latch 171j in accordance with one-shot pulse generated by one-shot circuit 171k from detection signals of sensor 16C.

When assuming that a mode is a measurement mode for interval displacement in the sub-scanning direction, counter 171h counts delay clock selc inputted from selector 171e and measures time intervals T1 and T2 between rises b1 (b2) and c1 (c2) of output of sensors 16B and 16C, while when assuming that a mode is a measurement mode for interval displacement in the primary scanning direction, the counter 171h measures time intervals T5 and T6 between rises a1 and d1 (d2) of sensors 16A and 16D. When assuming that a mode is a measurement mode for interval displacement in the sub-scanning direction, a counting range of the counter 171h is controlled by flip-flop 171g. The counter 171h latches a value of counting in latch 171i with one-shot pulse generated from detection signals of sensor 16C.

The time interval measuring section 171 measures, in the way stated above, time T1 and time T5 which represent detection intervals of sensors 16B and 16C in the case where laser beam L1 only is on, for example, and stores them in latch 171i, and then measures, in the same way, time T2 and time T6 in the case where laser beam L2 only is on and stores them in latch 171j. Due to this, time intervals T5 and T6 at the moment of detection by sensors B and C are obtained as a value of counting of clock and as a phase difference of clock to be latched.

Computing section 172 for displacement in the primary scanning direction compares the value of counting and the phase difference obtained in the above-mentioned manner respectively, then computes displaced time interval T5 in the primary scanning direction of multiple beams L1 and L2 by dividing it into a clock counting value and a clock phase difference, and latches the results of the computing in latches 172e and 172f. The computing section 172 for displacement in the primary scanning direction, when assuming the mode to be a measurement mode for interval displacement in the sub-scanning direction by judging the order of scanning of multiple beams L1 and L2 from the results of computation of displacement time, selects either sensor 16B or sensor 16C as an index signal, and latches the result of the selection.

The computing section 172 for displacement in the primary scanning direction is one to control a phase of printing clock and image forming timing, and it gives displacement within a cycle of a printing clock shown as a phase difference of the printing clock to selector 172h, and outputs phases of printing clock DCLK1 to be corresponded to laser beam L1 and printing clock DCLK2 to be corresponded to laser beam L2 selectively from printing clocks d10–d115 so that they may have a phase difference corresponding to the displacement. The computing section 172 for displacement in the primary scanning direction is composed of selector 172a, latch 172b, selector 172c, displacement computing section 172d, latches 172e and 172f, phase difference computing section 172g and selector 172h.

The selector 172a sends either one of detection results pd1 and pd2 to phase difference computing section 172g in accordance with results of selection of index signals, using detection output from phase detectors 171b and 171c as an input.

Selector 172c is arranged to latch data of displacement time T5 and results of selection of index signals based on trigger signal ZH generated when time Tφ is calculated at the time of turning on of power supply or immediately before image forming with only one laser beam turned on.

Displacement computing section 172d outputs a quantity of displacement shown as a phase difference of printing clock to phase difference computing section 172g through latch 172f.

Phase difference computing section 172g computes delay clock having a phase difference corresponding to a quantity of displacement for delay clock inputted from selector 172a, and outputs the results of the computation to selector 172h.

Selector 172h outputs index signals and printing clocks DCLK1 AND DCLK2 corresponding to multiple beams from information of phase difference based on displacement correction and from delay line 171d, using delay clocks d10–d115 and detection signals from sensors 16B and 16C selected by selector 172c as an input.

Computing section 173 for displacement in the sub-scanning direction is composed of time difference computing section 173a, latch 173b and displacement computing section 173d.

In the computing section 173 for displacement in the sub-scanning direction, when time T1 and time T2 are obtained respectively as a clock count number and a clock phase difference, time difference computing section 173a computes deviation of time T1 and time T2 separately for the count number and clock phase difference, and stores the results of the computation temporarily in latch 173b. Displacement computing section 173d compares a standard value given through an operating section with data stored in latch 173b, then computes displacement (an amount of an interval change) in the sub-scanning direction of multiple beams L1 and L2, and corrects the displacement in the sub-scanning direction by giving the results of the computation to an adjustment mechanism. In this case, when a mechanism capable of adjusting a scanning position in the sub-scanning direction is provided as disclosed in JAPANESE TOKKAISHO 63-50809, it is possible to correct the interval in the sub-scanning direction of multiple beams L1 and L2 to the prescribed value by adjusting the scanning position in the sub-scanning direction of multiple beams L1 and L2 based on information of the amount of displacement calculated above.

Next, operations of synchronization control circuit 170 will be explained, referring to FIGS. 10–12.

Figure 10:
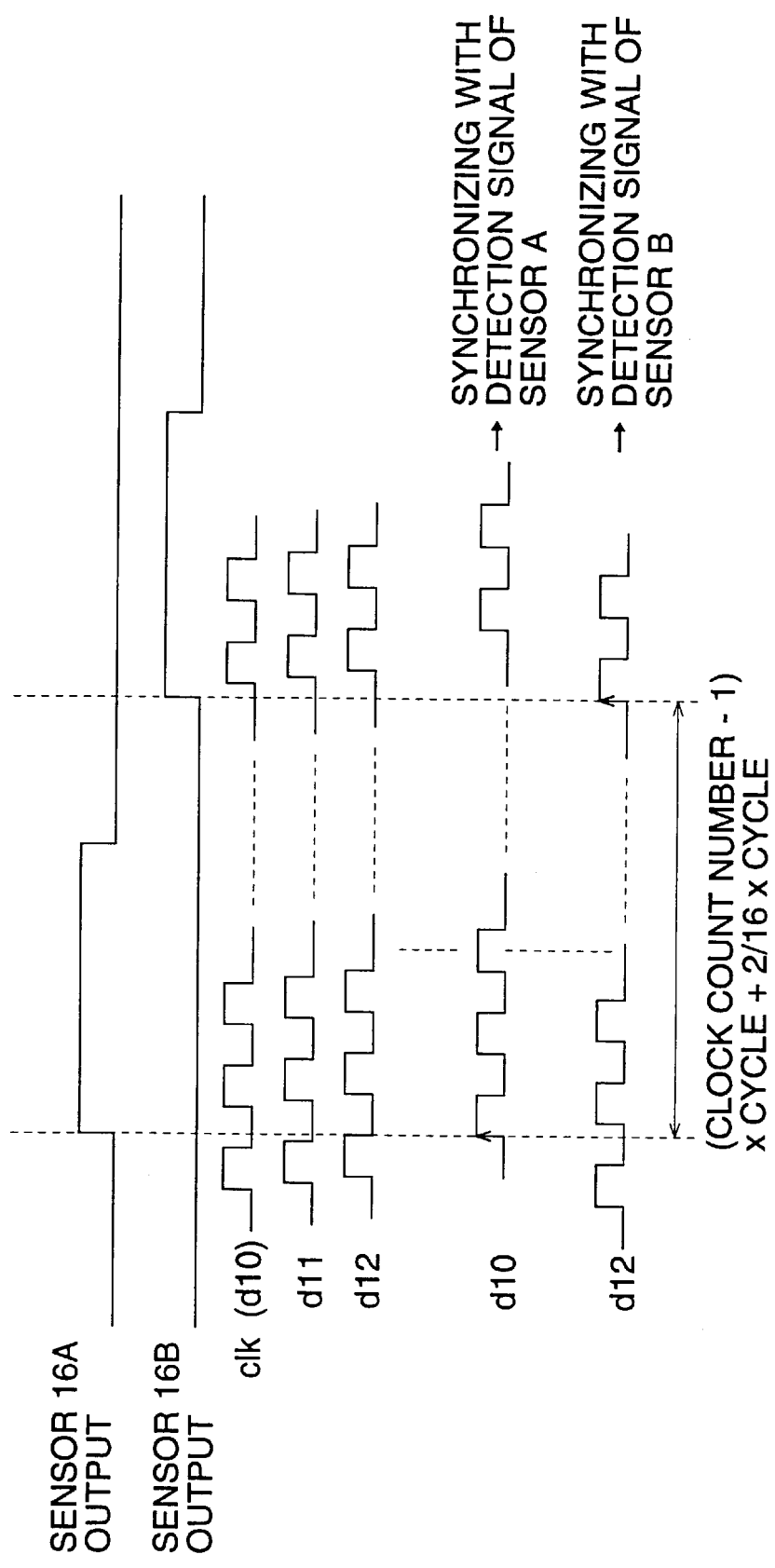
FIG. 10 is a time chart showing correction of displacement within a cycle of a print clock in the primary scanning direction.

FIG. 10 is a time chart showing correction of displacement within one cycle of printing clock in the primary scanning direction.

For example, let is be assumed that displacement in the primary scanning direction of multiple beams L1 and L2 is equivalent to two counts in printing clock and to two steps (2/16 cycle) in phase difference, provided in terms of structure that laser beam L1 is in the lead in the scanning direction, and laser beam L1 is caused to enter sensor 16B when multiple beams L1 and L2 are caused to enter sensors 16B and 16C selectively. In this case, delay clock synchronized with an index signal is outputted as printing clock DCLK1 corresponding to laser beam L1, and delay clock having a phase difference of 2/16 cycle for printing clock DCLK1 for beam L1 is outputted as printing clock DCLK2 for laser beam L2, while detection signals of sensor 16B are outputted as index signals. By outputting these printing clocks DCLK1 and DCLK2 each having a different phase, corresponding to multiple beams L1 and L2, an amount of displacement within one cycle of printing clock is compensated as a phase difference of printing clock.

Displacement in quantity that is an integral multiple of a cycle of printing clock is reflected on selector 172h which establishes image forming timing for each of multiple beams L1 and L2 based on the count of the printing clock. Thus, if the correction for compensating displacement in the primary scanning direction for each of multiple beams L1 and L2 is made separately for a phase of printing clock and image forming timing, it is possible to reduce loads on circuits and to manage occurrence of relatively large displacement, compared with an occasion where image forming timing only is corrected by a quantity of displacement.

Incidentally, when it is discriminated from the results of computation of displacement time that laser beam L2 is in the lead in the primary scanning direction, image forming timing of laser beam L1 scanned after the detection of laser beam L2 conducted by sensor 16C and a phase of printing clock can be corrected.

Figure 11:
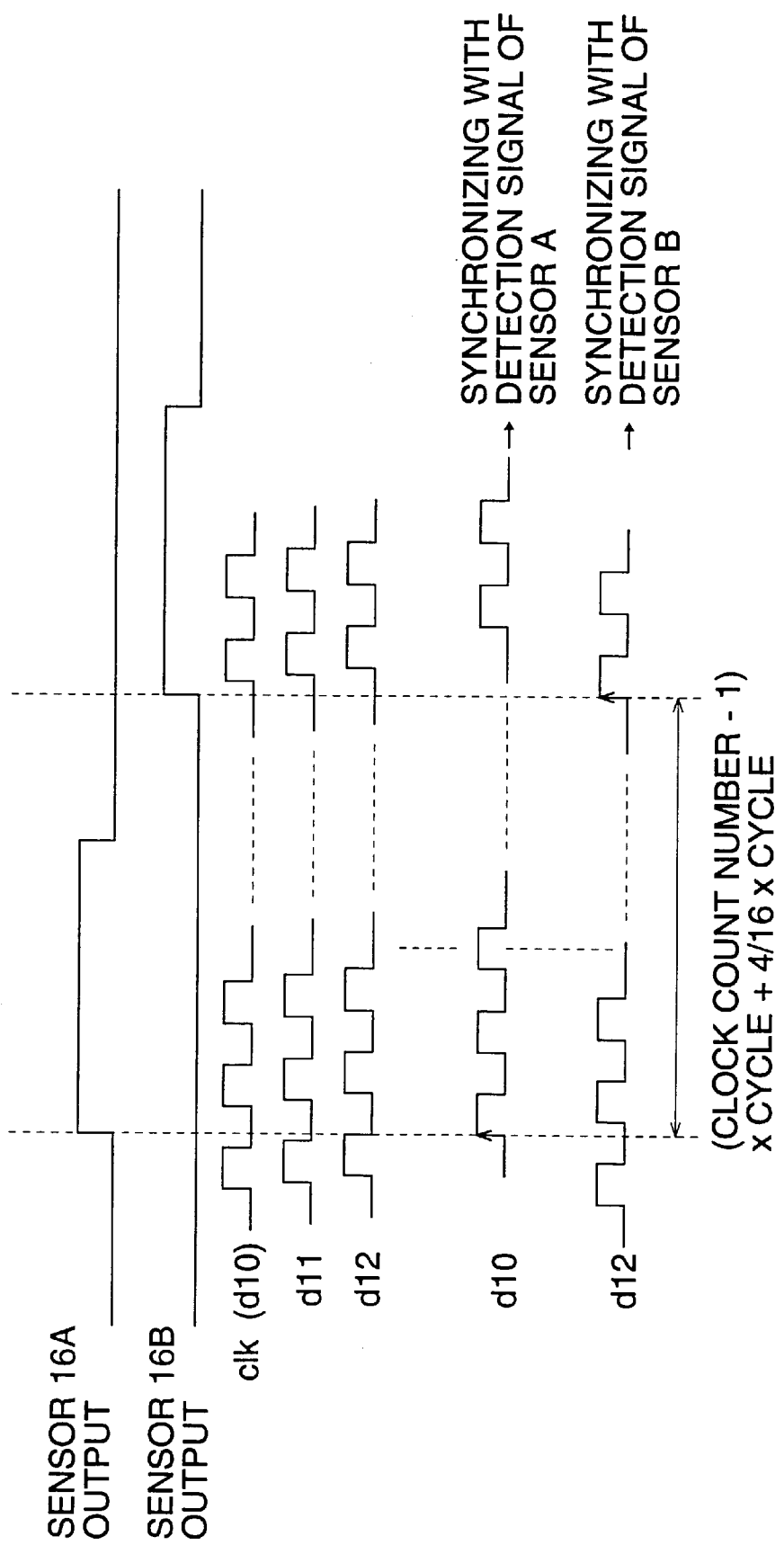
FIG. 11 is a time chart showing correction of displacement in an integral multiple of a print clock in the primary scanning direction.

FIG. 11 is a time chart showing the correction of displacement in quantity that is an integral multiple of a cycle of printing clock in the primary scanning direction.

For example, when assuming that the position of the laser beam L1 in the lead to start writing is the moment when the count number of printing clock DCK1 from index signals arrives at N, the count number of printing clock DCLK2 from index signals which is made to correspond to the moment of "N+count number equivalent to a quantity of displacement" means that displacement in quantity which is an integral multiple of a cycle of printing clock DCLK is compensated.

Further, since displacement within one cycle of printing clock DCLK is corrected by a phase difference of printing clocks DCLK1 and DCLK2 corresponding respectively to multiple beams L1 and L2 as stated above, it is possible to conduct image recording in high fidelity by multiple beams L1 and L2 by correcting displacement in the primary scanning direction obtained as a count number of printing clock and as a phase difference of printing clock.

Incidentally, with regard to a quantity of displacement obtained as a count number of a clock, HV signal (horizontal and vertical synchronization signal) for controlling time to start image forming is corrected by the control of an effective image area corresponding to the count of printing clock with a standard of common index signal, concerning a quantity of displacement indicated by the count number of printing clock for each of multiple beams L1 and L2.

Figure 12:
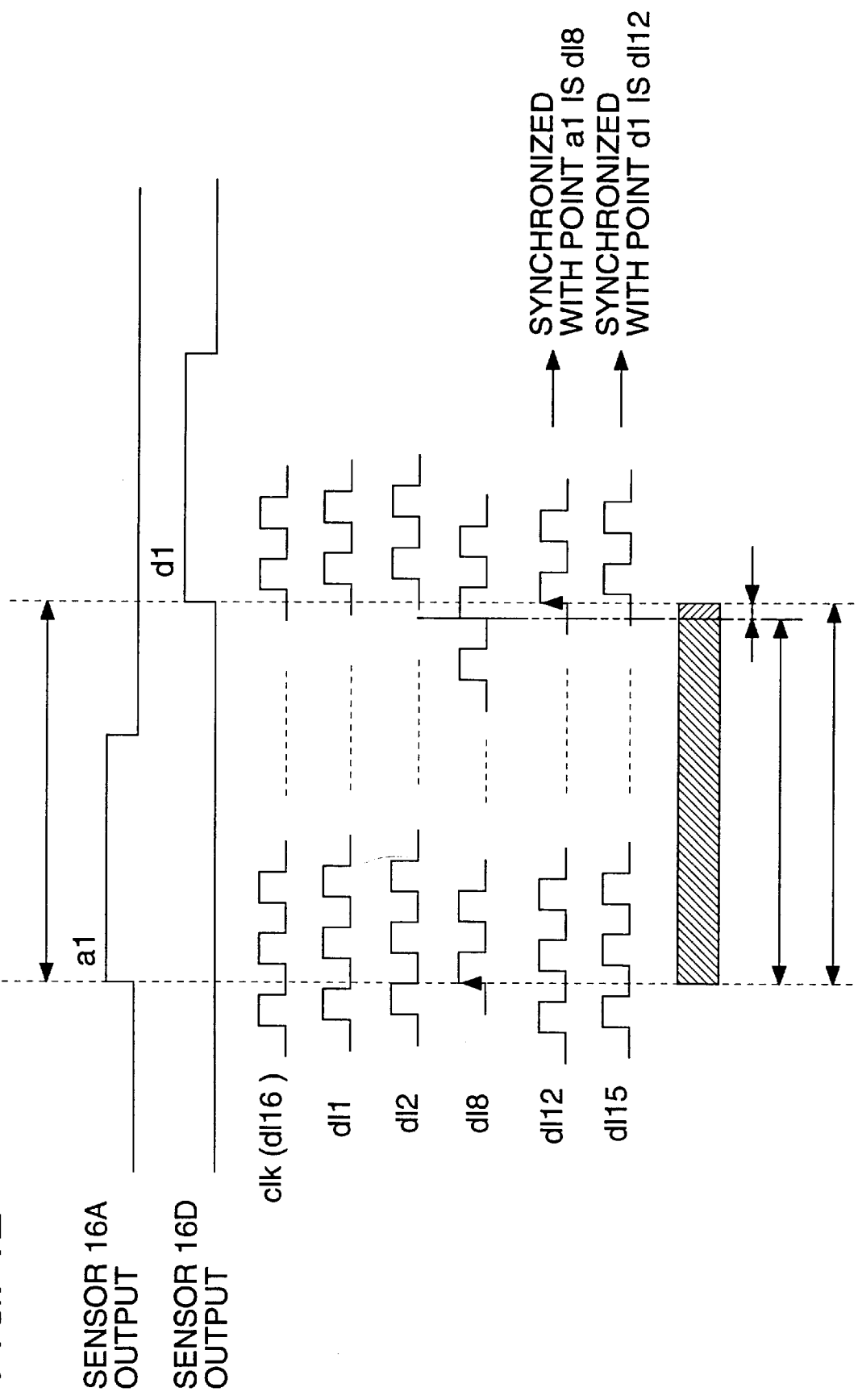
FIG. 12 is a time chart for detecting displacement in the sub-scanning direction.
Figure 13:
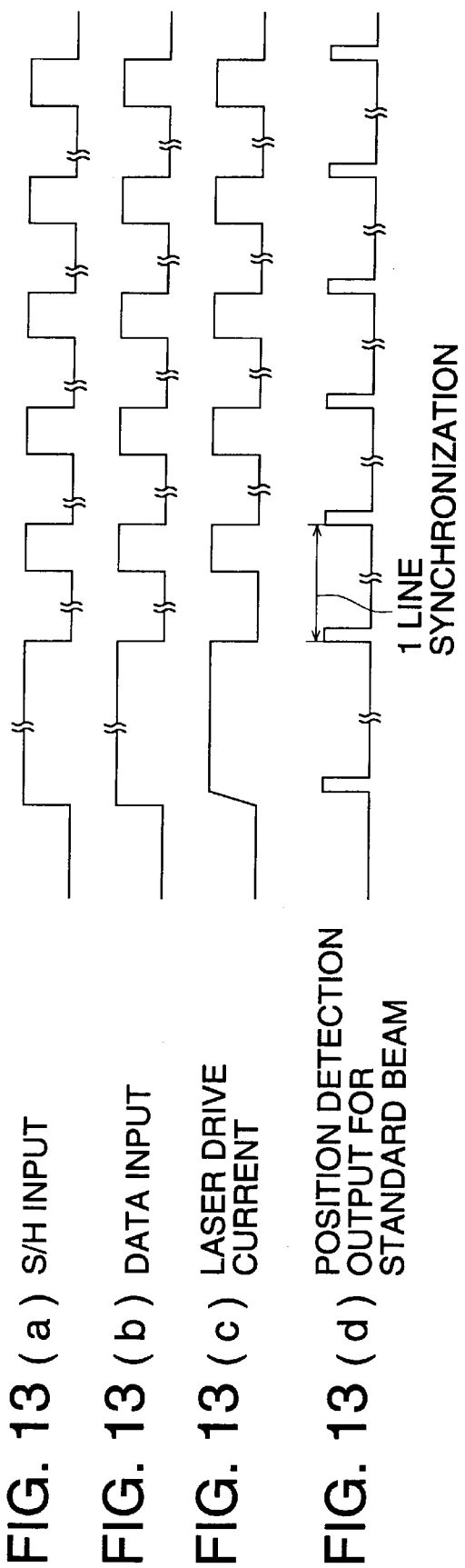
FIGS. 13(a) to 13(d) are time charts showing operations of a conventional non-multi scanning control circuit.
Figure 14:
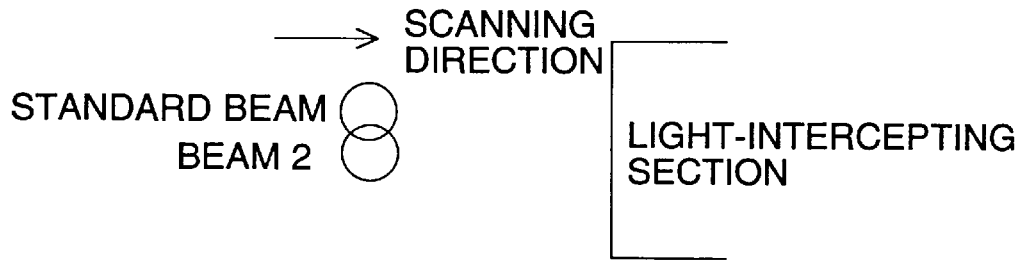
FIGS. 14(a) to 14(d) are conceptual diagrams showing how multiple beams scan an index sensor.
Figure 14:
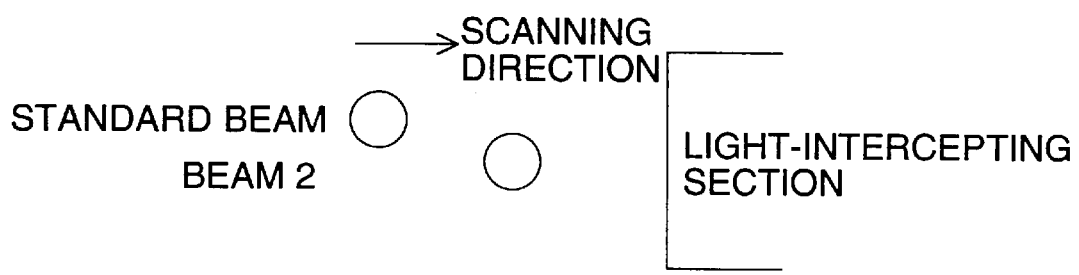
Figure 14:
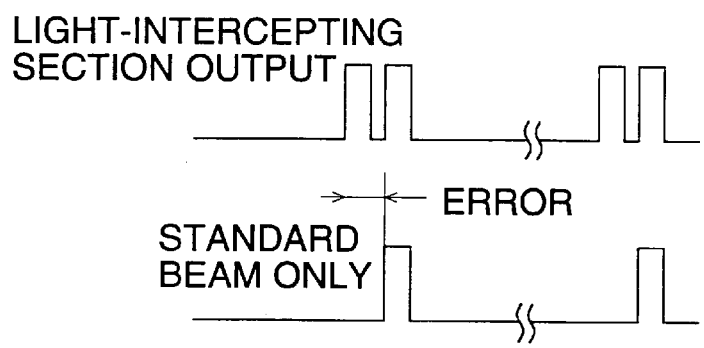
Figure 14:
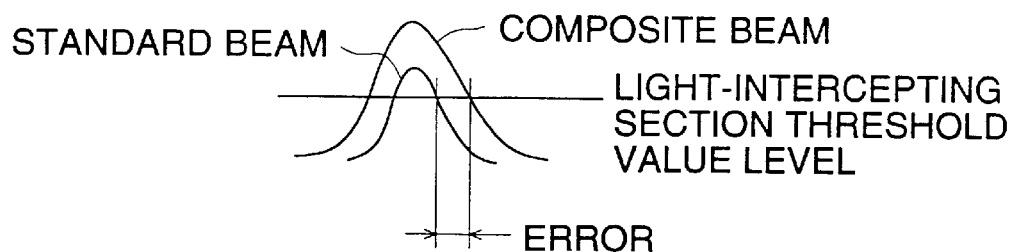

FIG. 12 is a time chart which detects displacement in the sub-scanning direction.

FIG. 12 shows an occasion wherein time difference (time between a1 and d1) between detection of laser beam L1 by sensor 16A and detection of laser beam L1 by sensor 16D is measured.

In FIG. 12, delay clocks d10D (standard clock)–d115 in 16 kinds are generated from digital delay lines by delaying standard clock clk gradually by 1/16 cycle. In FIG. 10, clocks clk, d11, d12, d18, d112 and d115 only are shown, and other clocks are not shown. When assuming that a clock (clock which first rises immediately after the rise of detection signals) synchronized with rise a1 of detection signal of sensor 16A, for example, represents clock d18, the rise in the synchronization is the first count, and then the rise of the clock d18 is counted in succession.

When assuming that the detection signal of sensor 16D rises in the course of the counting mentioned above, and a clock synchronized with rise (d1) of the detection signal represents clock d112, an output time difference (an interval between a1 and d1) of detection signals of sensors 16A and 16D is represented by the value obtained by adding a phase difference (which is 4/16 cycle and can be indicated as delay clock number=d14) between clock d18 and clock d112 to the time obtained by multiplying clock cycle to a value obtained by subtracting 1 from the number (including the rise of clock d18 synchronized with detection signal (a1) of sensor 16A) in which the rises of clock d18 has been counted up to that moment.

In the detection of displacement in the sub-scanning direction, standard time corresponding to the prescribed value of an interval is given respectively as a clock count number and a delay clock number while obtaining time T1 and time T2 as a clock count number and a delay clock number as stated above, and in the computation of time difference, the count number and the delay clock number can be computed respectively.

In this case, information of displacement in the sub-scanning direction is outputted to an adjusting mechanism (for example, a stepping motor) as a clock count number and a delay clock number.

As stated above, in the semiconductor laser control circuit in the present embodiment, the position to start writing is controlled by delaying the generation of a horizontal synchronization signal corresponding to laser beam L2 by time T7 against the generation of horizontal synchronization signal corresponding to laser beam L1.

In addition, when time T5 and time T6 are obtained as a count number of delay clock and a clock phase difference, horizontal synchronization signal is adjusted based on the count number of clock, and a quantity of displacement obtained as a clock phase difference can also be adjusted by the selection of printing clocks corresponding to multiple beams L1 and L2 from delay clocks d10–d115.

Accordingly, in semiconductor laser control circuit 100 provided with the above-mentioned structures in the present embodiment, displacement of optical axis both in the primary scanning direction and the sub-scanning direction can be detected accurately. Therefore, it is possible to record stable images by making the optical axis in the sub-scanning direction to be the regular position and by conducting the control of start writing in accordance with positional relation of laser beams in the primary scanning direction.

Inventions described in items 1–2 make it possible to detect accurately the position to start writing and the position of the laser beam which serves as a standard for displacement of an optical axis, by stabilizing a quantity of light of multiple beams before multiple beams arrive at light-intercepting portions of index sensors.

What is claimed is:

1. An apparatus for scanning with multiple beams emitted from a semiconductor laser by a polygonal mirror, wherein an image is written for each scanning line by each beam of the multiple beams, said apparatus comprising:

an automatic light amount control circuit including: (i) a light amount detecting circuit to detect a light amount of each beam for each scanning line, and (ii) a sampling/holding circuit to sample and hold a control voltage corresponding to the detected light amount of each beam for each scanning line, wherein the sampling/holding circuit comprises a plurality of sample-hold circuits, each one being provided for a respective one of the multiple beams and holding the control voltage for the respective one of the multiple beams, said automatic light amount control circuit controlling the semiconductor laser based on the control voltage held by each of the plurality of sample-hold circuits so as to control the light amount of each beam to be a predetermined light amount for each scanning line; and a synchronization control circuit having an index sensor and a light receiving section on which each beam passes, said index sensor detecting a passage of each beam on the light receiving section and generating a passage signal for each beam, and said synchronization control circuit controlling each beam based on the passage signal so as to be synchronized with other beams for each scanning line;

wherein the automatic light amount control circuit finishes controlling the light amount of each beam for each scanning line before each beam on each scanning line enters the light receiving section of the synchronization control section so that when each beam passes the light receiving section for each scanning line, each of the plurality of sample-hold circuits holds the control voltage for the respective one of the multiple beams and each beam has the predetermined light amount.

2. The apparatus of claim 1, wherein the light amount detecting circuit outputs a feedback voltage corresponding to the light amount of each beam, and the automatic light amount control circuit comprises a comparator for comparing the feedback voltage with a reference voltage and for outputting the control voltage to the sampling/holding circuit.

3. The apparatus of claim 1, wherein the light amount detecting circuit comprises a plurality of photodetectors, each one being provided for a respective one of the multiple beams.

4. The apparatus of claim 1, wherein the semiconductor laser is integrally formed in a single body.

5. The apparatus of claim 1, wherein the semiconductor laser comprises a plurality of bodies corresponding in number to the multiple beams.

6. The apparatus of claim 1, wherein a predetermined one of the multiple beams is designated as a reference beam, and the synchronization control circuit detects a deviation of each other one of the multiple beams from the reference beam and eliminates the deviation of each beam.

7. A method of scanning with multiple beams emitted from a semiconductor laser by a polygonal mirror, wherein an image is written for each scanning line by each beam of the multiple beams, comprising:

detecting a light amount of each beam for each scanning line;

sampling and holding a control voltage corresponding to a light amount of each beam for each scanning line;

controlling the semiconductor laser based on the held control voltage so as to control the light amount of each beam to be a predetermined light amount for each scanning line;

detecting each beam passing on a light receiving section and generating a passage signal for each beam; and synchronizing each beam with other beams for each scanning line based on the passage signal;

wherein control of the light amount of each beam to be the predetermined light amount for each scanning line is finished before each beam on each scanning line enters the light receiving section.

8. The method of claim 7, wherein the control voltage is held when the multiple beams pass the light receiving section.

\* \* \* \* \*